Patented May 29, 1951

2,555,111

UNITED STATES PATENT OFFICE 2,555,111

POLYAMIDE RESIN FROM DIMERIZED UNSATURATED FATTY ACIDS OF NATURAL FATTY OILS

Theodore F. Bradley, Oakland, Calif., assignor to Shell Development Company, San Francisco, Calif., a corporation of Delaware No Drawing. Application September 4, 1948, Serial No. 47,942

7 Claims. (Cl. 260—404.5)

This invention relates to a new polyamide resin having unexpectedly advantageous properties.

Polyamide resins have been prepared heretofore from aliphatic diamines such as ethylene diamine and addition polymers of drying oil fatty acids. Resins of this kind are described in my U. S. Patent No. 2,379,413. I have now discovered that by preparing the resins from a different type of diamine, the resulting polyamide has solubility and compatibility characteristics giving utility not possible with my former resins.

According to the present invention, the polyamide resin is made from a saturated aliphatic diamine containing two primary amino groups, one of which is directly linked to a saturated tertiary carbon atom. In order that the polyamide will possess the desired favorable properties, it is essential that the diamine contain at least one primary amino group linked directly to a tertiary carbon atom, but the other primary amino group may be linked to a primary, secondary, or tertiary carbon atom although it is preferred to have it linked to a secondary carbon atom. Among representative diamines which are used in making the product of the invention are: 1,2-diamino-2-methylpropane, 2,3-diamino-2-methylbutane, 2,4-diamino-2-methylpentane, 2,3-diamino-2,3-dimethylbutane, 2,5-diamino-2,5-dimethylhexane, 3,4-diamino-3,4-dimethylhexane, 2,6-diamino-2,6-dimethylheptane, 2,7-diamino-2,7-dimethyloctane, etc. The diamines necessarily contain at least four carbon atoms, and it is preferred to use those of six to ten carbon atoms. The primary amino groups may be linked to directly adjacent or vicinal carbon atoms, or to carbon atoms separated by one or more intervening carbon atoms. Preferably the diamine has only one intervening carbon atom separating the two carbon atoms to each of which is linked directly one of the two primary amino groups.

The aliphatic diamines may be represented by the formula $NH_2—C_nH_{2n}—NH_2$, wherein $n$ is an integer of at least four, and at least one $NH_2$ group is linked directly to a tertiary carbon atom.

The compound 2,4-diamino-2-methylpentane is particularly preferred in making the product of the invention. For convenience, the invention will be described with particular reference thereto, although it is to be understood that the other new polyamides prepared from the diamines fulfilling the requirements of structure defined above behave similarly and are included within the scope of the present invention.

The preferred diamine 2,4-diamino-2-methylpentane may be prepared in the following manner. Acetone and liquid ammonia are heated at 30° C. to 40° C. in the presence of about 1 to 5% concentrated hydrochloric acid whereby there is formed 2,2,4,4,6 - pentamethyltetrahydropyrimidine. After separation from the reaction mixture by distillation, this compound along with liquid ammonia in a ratio of 1 to 5 mols per mol of the pyrimidine is heated and reacted at 140° C. to 150° C. in the presence of a hydrogenation catalyst such as Raney nickel with hydrogen under a pressure of 500 to 1500 pounds per square inch. Further details on producing the diamine are disclosed in copending application, Serial No. 736,610, filed March 24, 1947, which matured as Patent No. 2,486,648. In like manner, other diamines of this type which are used in preparing the polyamide of the invention may be obtained from other lower saturated aliphatic ketones such as methyl ethyl ketone, methyl propyl ketone, diethyl ketone and the like. Thus, methyl ethyl ketone may be reacted with ammonia to produce a mixture of the isomers 2,4,5,6-tetramethyl-2,4-diethyltetrahydropyrimidine and 2,4-dimethyl-2,4,6-triethyl-tetrahydropyrimidine. Upon reacting this isomeric mixture with hydrogen and ammonia, there is obtained the mixture of diamines 3,5-diamino-3,4-dimethylhexane and 3,5-diamino-3-methylheptane, from which diamine mixture polyamide resin of the invention can be prepared.

The new polyamide is prepared from the diamine and additively polymerized olefinically unsaturated fatty acid. The acid constituent used in making the polyamide is dimerized natural oil unsaturated fatty acids, the dimerized drying oil polyene fatty acids being preferred. Fatty oils, from which the acids are derived, are ordinarily esters, usually the glycerides of aliphatic monocarboxylic acids. The nature of the acid residue varies in different oils. In some oils, a substantial portion of the acid residue is readily convertible to the polymerized form of the acid. The acids employed as addition polymers in making the product of the invention are in general straight-chain aliphatic monocarboxylic acids containing 16 to 22 carbon atoms in the chain, and having at least one, and preferably two to five aliphatic carbon-to-carbon double bonds.

The dimerized unsaturated fatty acids used in the product of the invention are obtainable by known methods. For example, such monoolefinic acids as palmitoleic, oleic, petroselinic, vaccenic, gadoleic, cetoleic or erucic acid are polymerized by heating in contact with a Friedel-Crafts metal halide such as boron trifluoride, aluminum chloride, stannic chloride or the like.

The free monocarboxylic acid or its methyl ester in the presence of 0.5 to 5% of the metal halide is heated at 50° C. to 150° C. for several hours. After removal of the catalyst, as by washing the product with water, the product is distilled under vacuum to remove unpolymerized monomer. The dimeric polymer is obtained from the residue of distillation by extraction with selective solvents therefor such as alcohols, ketones, nitriles, lower paraffins or mixtures thereof, a mixture of amyl alcohol and acetonitrile being particularly suitable. The dimerized product is obtained from the extract by distilling the solvent therefrom.

While dimerized monoolefinic fatty acids can be used in preparing the product of the invention, it is much preferred to use the dimers of acids containing at least two olefinic double bonds. The initial acids are thus preferably polyene (di- to pent-ene) fatty acids of 16 to 22 carbon atoms. Representative acids of this preferred class are hiragonic acid, linoleic acid, linolenic acid, elaeostearic acid, licanic acid, arachidonic acid and clupanodonic acid. Substantial quantities of one or more of these acids occur (in the form of glycerides) in many natural oils including linseed, soy bean, corn, cottonseed, hempseed, kapok seed, herring, perilla, poppy seed, pilchard, whale, menhaden, mustard, peanut, rapeseed, salmon, sardine, walnut, dehydrated castor, rubber seed, safflower, sesame, tung and oiticica oils. Thus, although there is some variation due to geographical and climatic differences, linseed oil contains about 45% linolenic acid and about 5% linoleic acid; soy bean oil contains about 50% linoleic acid; tung oil contains about 80% elaeostearic acid; cottonseed oil contains about 40% linoleic acid; hempseed oil contains about 50% linoleic acid and about 25% linolenic acid; perilla oil contains about 40% linoleic acid and about 45% linolenic acid; and oiticica oil contains about 10% linolenic acid and about 75% licanic acid. Dimerized linseed fatty acid is very suitable for making the polyamide of the invention.

The various polymerizable polyene acids may be converted to the dimeric form by polymerization treatment. The naturally occurring oils which are essentially glycerides are subjected to alcoholysis with methyl alcohol so as to convert them to the methyl esters of the mixture of fatty acids therein. This is effected by heating the oil with excess methyl alcohol and a small amount of sodium methylate as catalyst for several hours under reflux. The catalyst is neutralized with acetic acid and the excess methyl alcohol removed by distillation. The residue is allowed to stand until a separation of the glycerol layer can be effected. The separated ester layer is then distilled to obtain the product which is a mixture of methyl esters of the different acids contained in the starting oil, some polymerizable and some not. The whole mixture of esters is subjected to polymerization.

The additive polymerization is effected by heating the methyl ester at about 300° C. for several hours under a nitrogen or carbon dioxide atmosphere. Full details are given in a published article, Industrial and Engineering Chemistry, volume 32, pages 802 to 809 (1940). After the polymerization treatment, the resulting product is distilled to remove unreacted material. The polymerized acids are obtained therefrom by saponification, for example, by treatment with sodium hydroxide followed by acidification with a mineral acid such as hydrochloric acid to obtain the free polymeric acid.

Another method for obtaining the additively polymerized acid is to subject the free acid secured in usual fashion from the afore-mentioned oils to heat treatment at about 330° C. to 360° C. for 3 to 8 hours under 85 to 400 lbs. steam pressure. The presence of the steam appears to prevent decarboxylation. The resulting product is distilled for removal of unreacted monomeric acid.

Either method gives a substance which is predominantly dimerized fatty acid. While the product contains an insignificant proportion of higher polymer, it is primarily a dicarboxylic acid of 32 to 44 carbon atoms which number is dependent upon the particular starting monomeric acid.

The polyamide product of the invention is prepared by heating and reacting the polymerized fatty acid with the diamine. In order to avoid undue discoloration of the product, the reaction mixture is preferably heated in an atmosphere of an inert gas such as carbon dioxide, nitrogen or methane. As the heating continues, amidization occurs with formation of very large linear molecules, and water is eliminated as a product of the reaction. The formed water is allowed to distill out of the reaction mixture, which action is aided by allowing a slow stream of the inert gas to be bubbled through the reaction melt. If desired, an inert solvent like xylene may be present to assist removal of water by azeotropic distillation.

One method of preparing the product of the invention will be evident from the following examples, in all of which the proportions are in parts by weight.

*Example I*

Polyamide resin is prepared from 2,4-diamino-2-methylpentane and polymerized linseed fatty acid by refluxing 29 parts of the diamine and 70 parts (0.25 equivalent) of the acid along with 43 parts of xylene while slowly passing natural gas and nitrogen through the reaction mixture so as to avoid contact of the mixture with air. The heating is continued at about 180° C. for 4 hours while removing the formed water of reaction after which the xylene and excess diamine are distilled from the mixture. The reaction melt is poured out while hot. Upon cooling, it is a stiff, barely fluid product of clear brownish color.

The resulting polyamide resin is soluble in all proportions with ethyl alcohol. On the other hand, the corresponding polyamide made from ethylene diamine rather than 2,4-diamino-2-methylpentane is insolube in ethyl alcohol.

*Example II*

A larger proportion of diamine may be used, if desired. Thus, 100 parts of 2,4-diamino-2-methylpentane and 70 parts of dimerized linseed oil fatty acid along with 43 parts of xylene is mixed and heated in a nitrogen atmosphere for 6 hours under reflux while permitting water removal. The reaction mixture is then distilled under vacuum finally to a temperature of 150° C. under 2 mm. Hg pressure in order to remove the xylene and excess amine. Upon cooling, the polyamide resin is a light-colored solid.

The resulting polyamide is soluble in methyl alcohol and in ethyl alcohol at room temperature (about 20° C.). It is also soluble in boiling methyl alcohol and in boiling ethyl alcohol. In contrast thereto, the corresponding polyamide resin made from ethylene diamine instead of 2,4-diamino-2-methylpentane, is insoluble in methyl alcohol and in ethyl alcohol at room temperature, as well as being insoluble in boiling methyl alcohol.

The different solubility characteristics of the products of the invention in comparison to the polyamides known heretofore are of great advantage for the present polyamides making them particularly useful in surface coating compositions which are best applied as solution. Thus my present polyamides can be applied as alcoholic solutions, which operation is not possible with the corresponding former products such as the ethylene diamine polyamides. The solubility characteristics of the polyamides of the present invention are markedly different from the usual polyamides such as the standard nylon from adipic acid and hexamethylene diamine which is soluble in virtually no other solvents than phenol, cresol, or hot glacial acetic acid.

The polyamides of the invention have another property making them particularly useful for surface coating purposes, namely, their compatibility with other coating materials such as nitrocellulose, cellulose acetate, polyvinyl butyral and copolymers of vinyl chloride and vinyl acetate. Such surface coating materials are otherwise well suited for that purpose except they are too brittle and lack flexibility. By incorporating a resinous softener therewith, surface coating films of great excellence are obtained.

In connection with this matter, chlorinated rubber is a highly suitable surface coating material with respect to hardness, durability and the like except that it is brittle and lacking in flexibility. The polyamide resins of the invention are compatible with chlorinated rubber and thus enable use therewith as a resinous softener.

Example III

An equal weight of the polyamide resin obtainable as described in Example II and chlorinated rubber containing about 68% chlorine is dissolved in a mixture of equal volumes of methyl isobutyl carbinol and toluene. The solution is spread on sheet steel and the solvent allowed to evaporate therefrom. The resulting film is clear and free of blemishes indicating complete compatibility of the two resins. The film is of flexible character such as desired for surface coating.

On the other hand, equal weights of the corresponding ethylene diamine polyamide and the chlorinated rubber when dissolved in like solvent and formed into a film, give a cloudy composition which indicates the polyamide to be very incompatible with the chlorinated rubber. Even after heating the formed film at 150° C. for one-half hour, the incompatibility remains.

Various temperatures may be used in condensing the polymerized acids with the diamines so as to form the desired polyamides. In general, temperatures of 125° C. to 250° C. are suitable. The proportion of reactants may also vary considerably and from about equivalent proportions to 100% or a greater excess of the diamine is satisfactory. The reaction is preferably continued in making the polyamide until the acid number of the reaction mixture is reduced to 20 or less, and most preferably, to no higher than 5. The time of reaction will range from about 1 to 10 hours depending upon the particular reactants, temperature and other conditions. While the examples set forth above describe use of an inert solvent in the mixture during the reaction for the purpose of assisting removal of water, and the use of excess diamine, neither is an essential feature in preparing the polyamide resin. Thus, the resins of the invention can be prepared in the absence of solvent and with equivalent proportions of reactants.

Example IV

A polyamide resin is prepared from polymerized cotton seed oil fatty acid which is predominantly dimerized linoleic acid. About 280 parts of the polymerized acid is mixed and heated with an equivalent proportion of 2,4-diamino-2-methylpentane (58 parts) while passing a slow stream of nitrogen through the reaction melt. During the course of an hour, the temperature is increased to 225° C. and then held at about that temperature for three additional hours. The reaction mass is next placed under vacuum down to a pressure of 1 mm. of Hg while at 225° C. for the purpose of removing volatile matter. The resulting polyamide resin is a soft solid at normal temperature.

In some cases, it is desirable to prepare "superpolyamides." This is effected with the method described in U. S. Patent No. 2,071,250 by subjecting the initial reaction product to treatment in a molecular still. In this manner, products of very high molecular weight are obtainable.

The polyamide resins of the invention can also be prepared by reacting the polymerized methyl ester of the polyene fatty acid with the diamine. This method enables direct use of the polymerized methyl ester without necessity of saponification and obtainment of free dimerized acid.

Example V

A polyamide resin is prepared by heating 74 parts of the polymerized methyl ester of soy bean fatty acid with 15 parts of 2,4-diamino-2-methylpentane at about 200° C. while slowly bubbling nitrogen therethrough to assist in removing the formed methylalcohol. After continuing the heating for about 5 hours, the resulting melt is vacuum distilled to 175° C. at a pressure of about 1 mm. of Hg. The resulting resin is a light-colored solid.

In order to obtain modification in the properties of the new resins, there may be employed in admixture with the dimerized polyene fatty acid, other substances such as succinic acid, adipic acid, sebacic acid or other dicarboxylic acids or their anhydrides. Limited amounts of fatty acids like stearic, oleic or linoleic may be likewise employed as modifiers. Nevertheless, it is preferable to employ the dimerized polyene fatty acids in major proportions for the new polyamide resins.

I claim as my invention:

1. The resinous polyamide of (1) dimerized olefinically unsaturated fatty acid of natural fatty oil, which fatty acid contains 16 to 22 carbon atoms, and (2) a saturated aliphatic diamine having two primary amino groups, one of which is linked directly to a tertiary carbon atom.

2. The resinous polyamide of (1) dimerized polyene fatty acid of natural fatty oil, which fatty acid contains 16 to 22 carbon atoms, and (2) a saturated aliphatic diamine having two primary amino groups, one of which is linked directly to a tertiary carbon atom.

3. The resinous polyamide of dimerized polyene fatty acid of a natural fatty drying oil and a saturated aliphatic diamine of 6 to 10 carbon atoms having two primary amino groups, one of which is linked directly to a tertiary carbon atom and the other of which is linked directly to a secondary carbon atom, said polyene fatty acid containing 2 to 5 olefinic double bonds and 16 to 22 carbon atoms.

4. The resinous polyamide of dimerized polyene fatty acid of natural fatty oil, which fatty acid contains 16 to 22 carbon atoms, and 2,4-diamino-2-methylpentane.

5. The resinous polyamide of dimerized polyene fatty acid of linseed oil and 2,4-diamino-2-methylpentane.

6. The resinous polyamide of dimerized polyene fatty acid of cottonseed oil and 2,4-diamino-2-methylpentane.

7. The resinous polyamide of dimerized polyene fatty acid of soybean oil and 2,4-diamino-2-methylpentane.

THEODORE F. BRADLEY.

REFERENCES CITED

The following references are of record in the file of this patent:

UNITED STATES PATENTS

| Number | Name | Date |
|---|---|---|
| 2,130,523 | Carothers | Sept. 20, 1938 |
| 2,371,736 | Carson | Mar. 20, 1945 |
| 2,379,413 | Bradley | July 3, 1945 |
| 2,442,958 | Morris et al. | June 8, 1948 |
| 2,450,940 | Cowan et al. | Oct. 12, 1948 |
| 2,461,495 | Floyd | Feb. 8, 1949 |
| 2,486,648 | Haury et al. | Nov. 1, 1949 |